(12) United States Patent
Dasgupta et al.

(10) Patent No.: US 11,895,008 B1
(45) Date of Patent: Feb. 6, 2024

(54) PREDICTIVE NETWORK ROUTING WITH DYNAMIC SMOOTHING ENVELOPE CREATION FOR NOISY NETWORK TIMESERIES

(71) Applicant: Cisco Technology, Inc., San Jose, CA (US)

(72) Inventors: Sambarta Dasgupta, Sunnyvale, CA (US); Vinay Kumar Kolar, San Jose, CA (US); Jean-Philippe Vasseur, Saint Martin d'Uriage (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/871,123

(22) Filed: Jul. 22, 2022

(51) Int. Cl.
| | | |
|---|---|---|
| *H04L 45/12* | (2022.01) | |
| *H04L 41/147* | (2022.01) | |
| *H04L 45/02* | (2022.01) | |
| *H04L 45/00* | (2022.01) | |
| *H04L 45/302* | (2022.01) | |

(52) U.S. Cl.
CPC .......... *H04L 45/123* (2013.01); *H04L 41/147* (2013.01); *H04L 45/08* (2013.01); *H04L 45/22* (2013.01); *H04L 45/302* (2013.01)

(58) Field of Classification Search
CPC ..... H04L 45/123; H04L 41/147; H04L 45/08; H04L 45/22; H04L 45/302
See application file for complete search history.

(56) References Cited

U.S. PATENT DOCUMENTS

| | | |
|---|---|---|
| 8,938,532 B2 | 1/2015 | Terrell et al. |
| 8,984,116 B2 | 3/2015 | Ge et al. |
| 9,395,697 B2 | 7/2016 | Turner |
| 10,970,161 B2 | 4/2021 | Dinh et al. |
| 2019/0007285 A1 | 1/2019 | Nevo et al. |

*Primary Examiner* — Abdulkader M Alriyashi
(74) *Attorney, Agent, or Firm* — BEHMKE INNOVATION GROUP LLC; Kenneth J. Heywood; James J. Wong

(57) ABSTRACT

In one embodiment, a device generates a plurality of smoothed timeseries by applying smoothing envelopes of different durations to a timeseries of a path metric for a path in a network that is used to convey traffic of an online application. The device uses the plurality of smoothed timeseries and the timeseries of the path metric to make predictions as to whether the path will provide an unacceptable user experience in the online application. The device selects a smoothing envelope of a particular duration, by comparing performance metrics for the predictions. The device uses a timeseries of the path metric smoothed using the smoothing envelope of the particular duration to make predictive routing decisions in the network for the traffic of the online application.

20 Claims, 12 Drawing Sheets

PREDICTIVE NETWORK ROUTING WITH DYNAMIC SMOOTHING ENVELOPE CREATION FOR NOISY NETWORK TIMESERIES

TECHNICAL FIELD

The present disclosure relates generally to computer networks, and, more particularly, to predictive network routing with dynamic smoothing envelope creation for noisy network timeseries.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. For instance, modeling path metrics such as delay, jitter, packet loss, etc. for a network path can be used to predict when that path will violate the SLA of the application and reroute the traffic, in advance. However, in real deployments, such metrics have been found to vary significantly during relatively short durations of time. This noisy data makes the prediction task much harder and can lead to poor performance of the prediction model.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
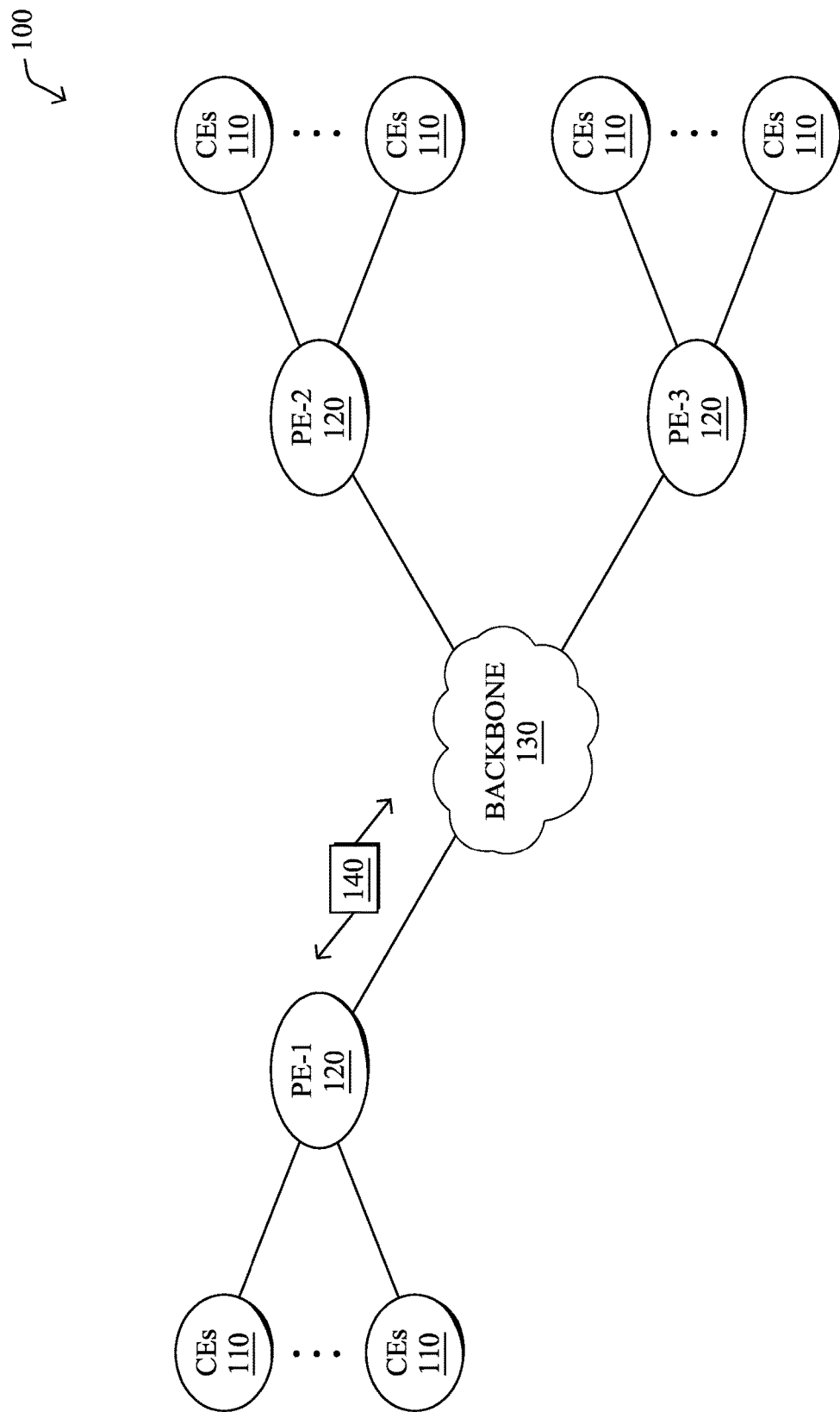
FIGS. 1A-1B illustrate an example communication network.

According to one or more embodiments of the disclosure, a device generates a plurality of smoothed timeseries by applying smoothing envelopes of different durations to a timeseries of a path metric for a path in a network that is used to convey traffic of an online application. The device uses the plurality of smoothed timeseries and the timeseries of the path metric to make predictions as to whether the path will provide an unacceptable user experience in the online application. The device selects a smoothing envelope of a particular duration, by comparing performance metrics for the predictions. The device uses a timeseries of the path metric smoothed using the smoothing envelope of the particular duration to make predictive routing decisions in the network for the traffic of the online application.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
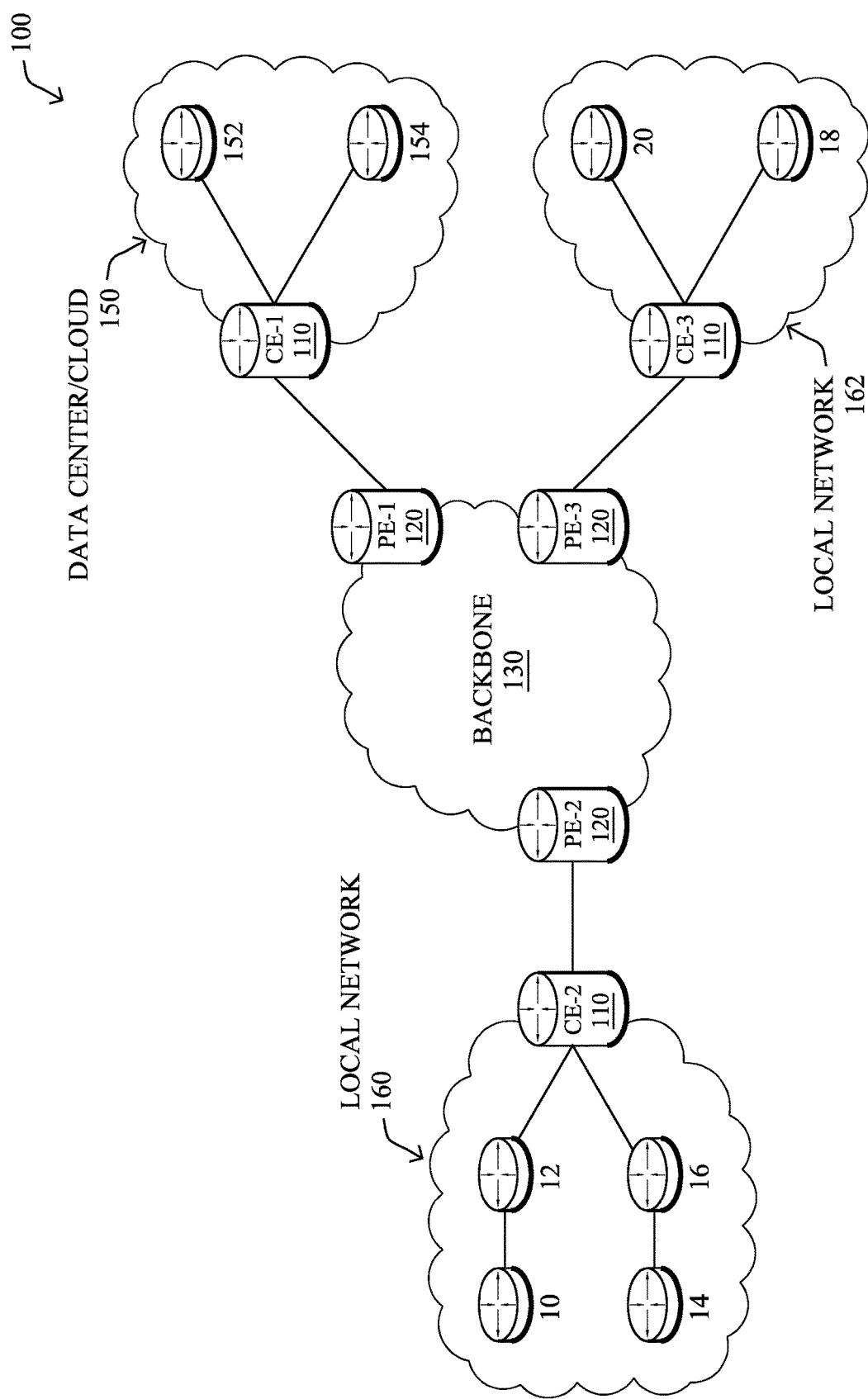

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
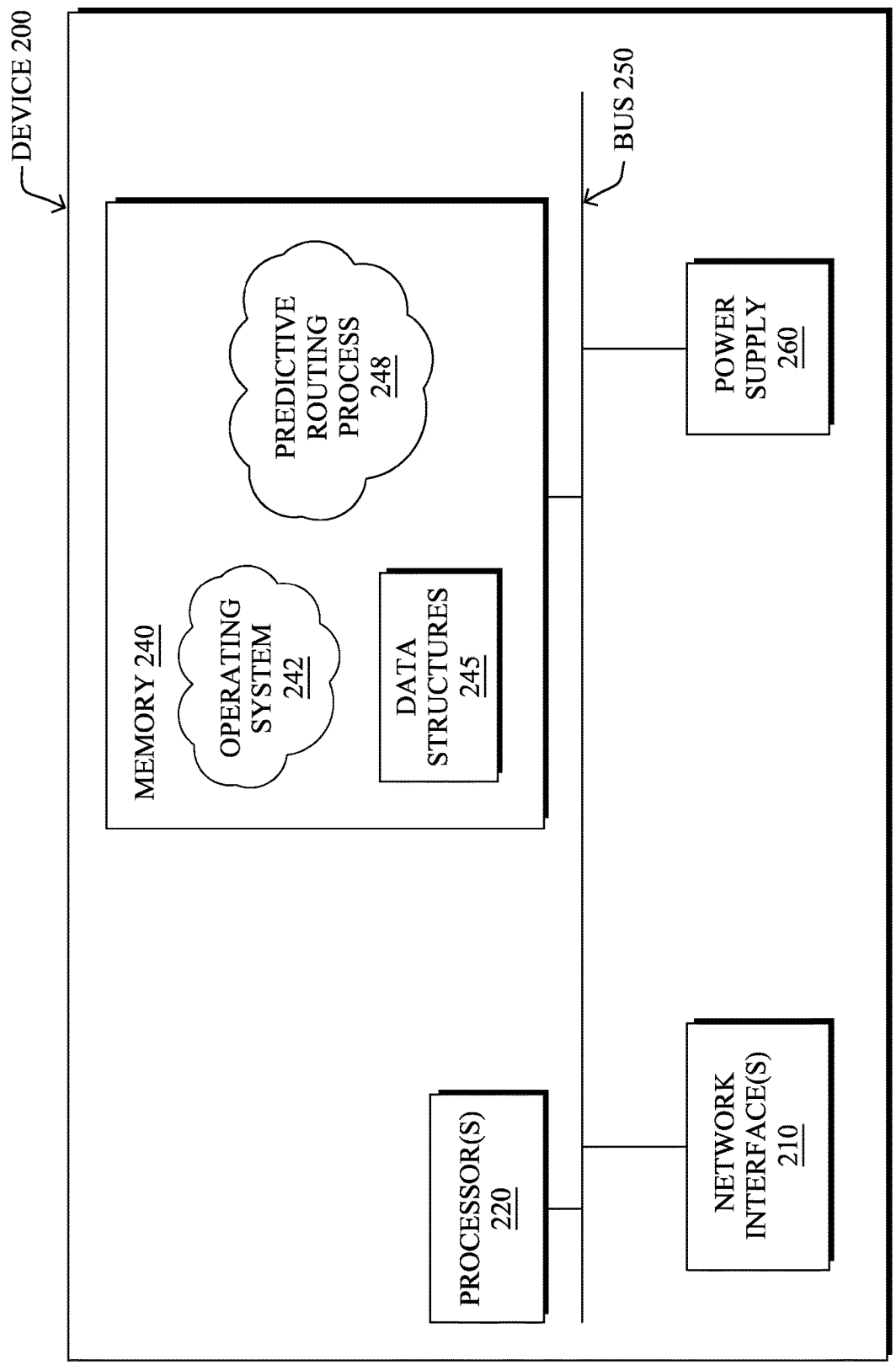
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 may include computer executable instructions that, when executed by processor(s) 220, cause device 200 to perform the techniques described herein. To do so, in some embodiments, predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure-as-a-service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
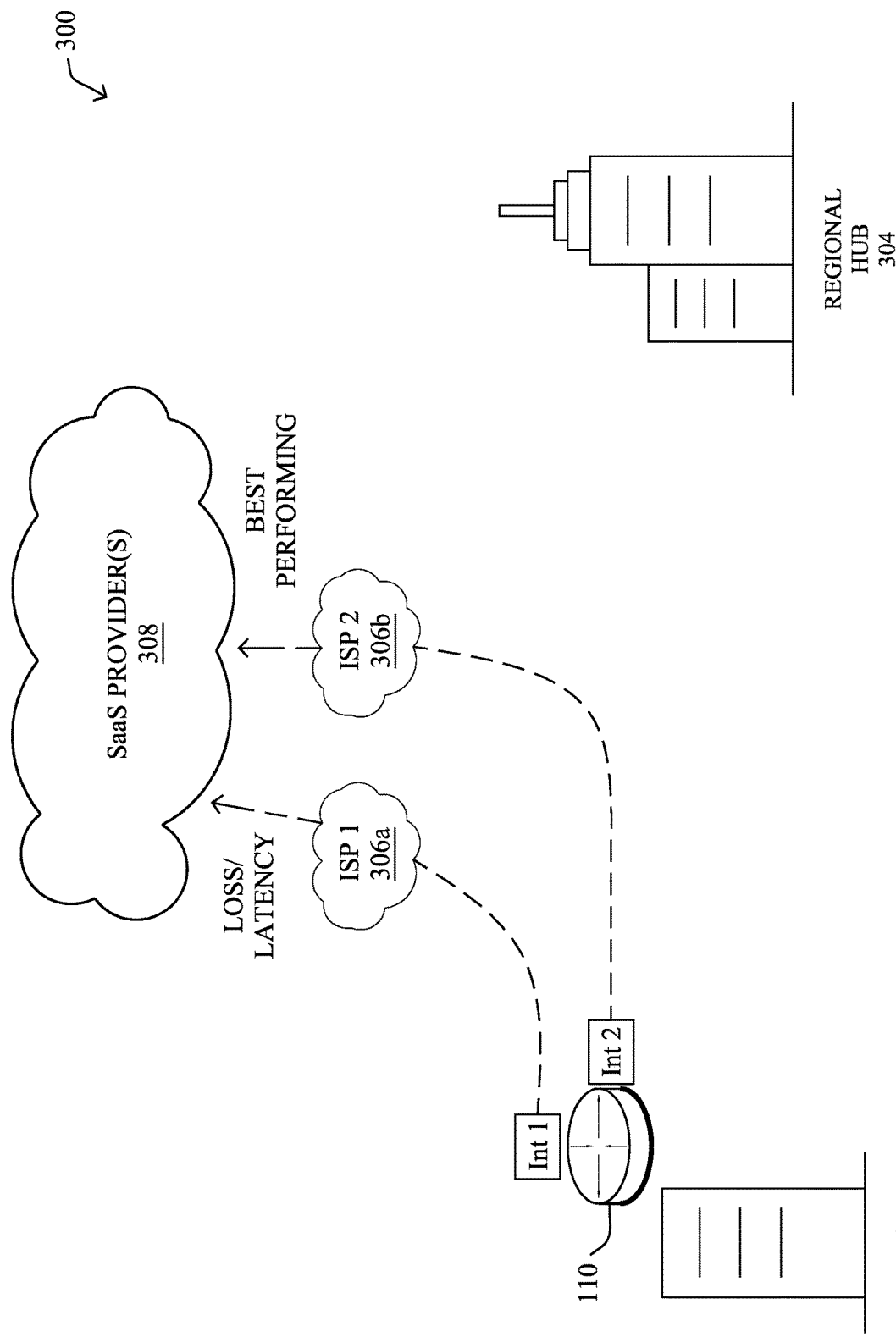
FIGS. 3A-3B illustrate example network deployments.
Figure 3B:
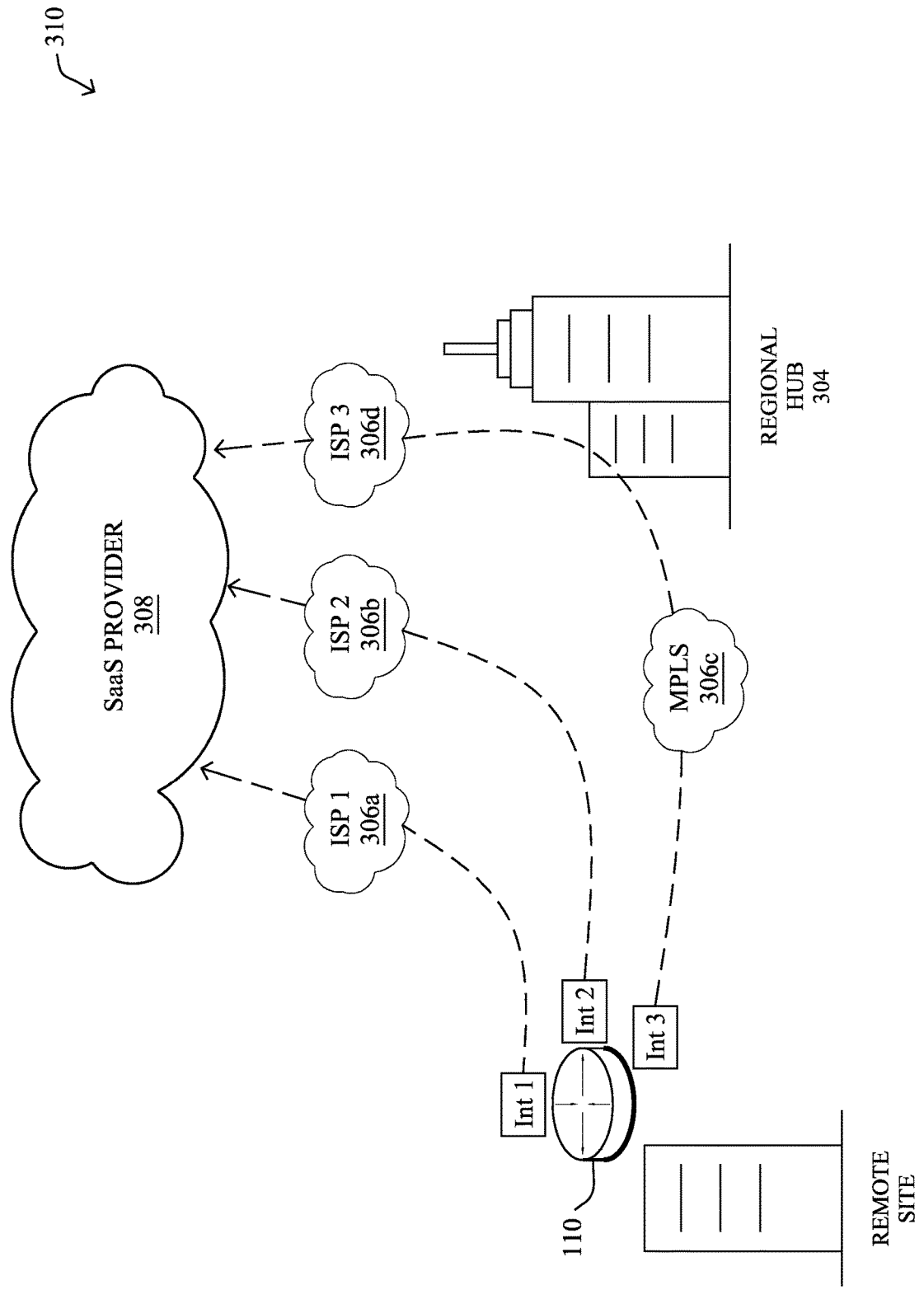

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
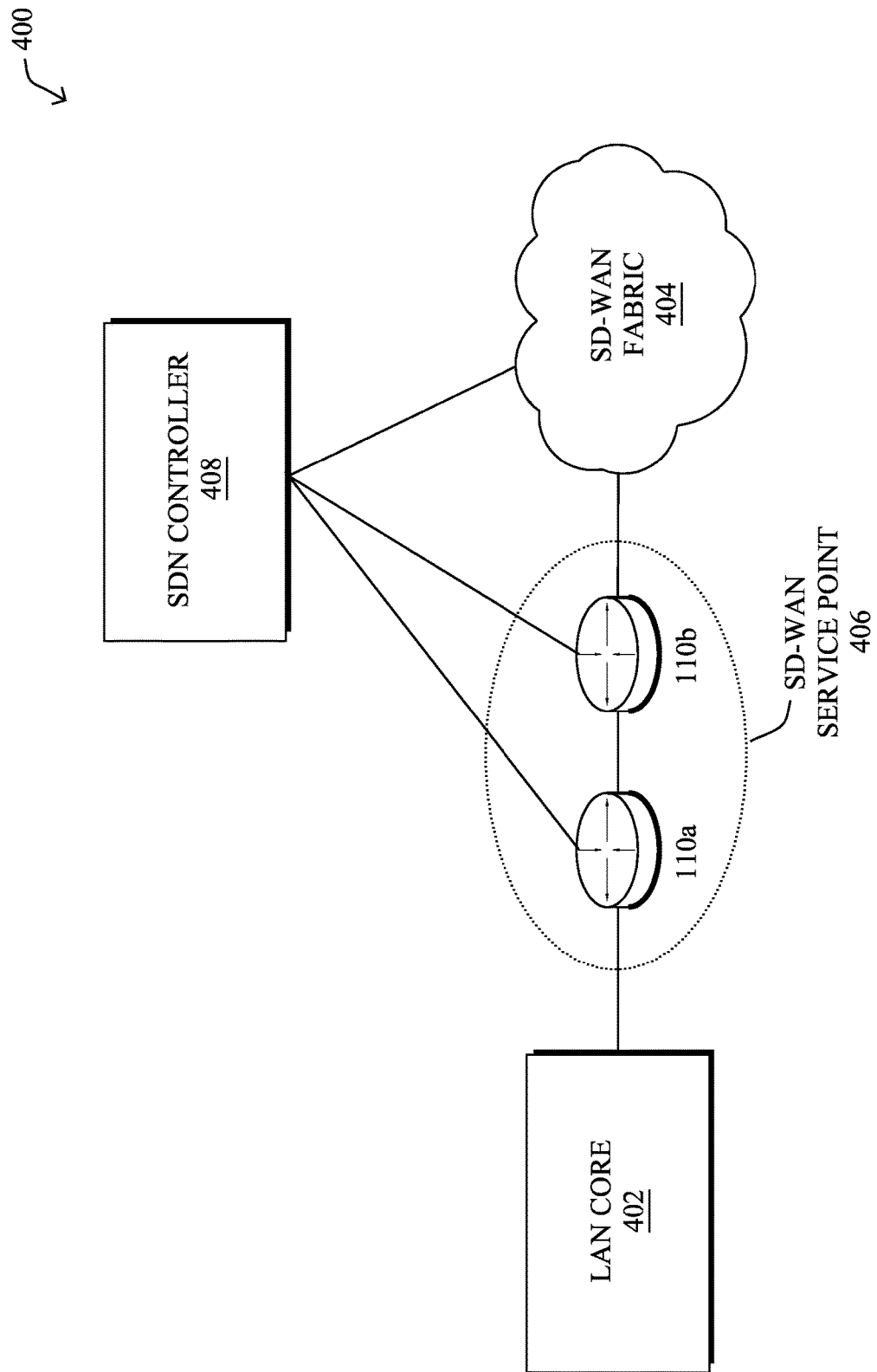
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to route traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QOE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
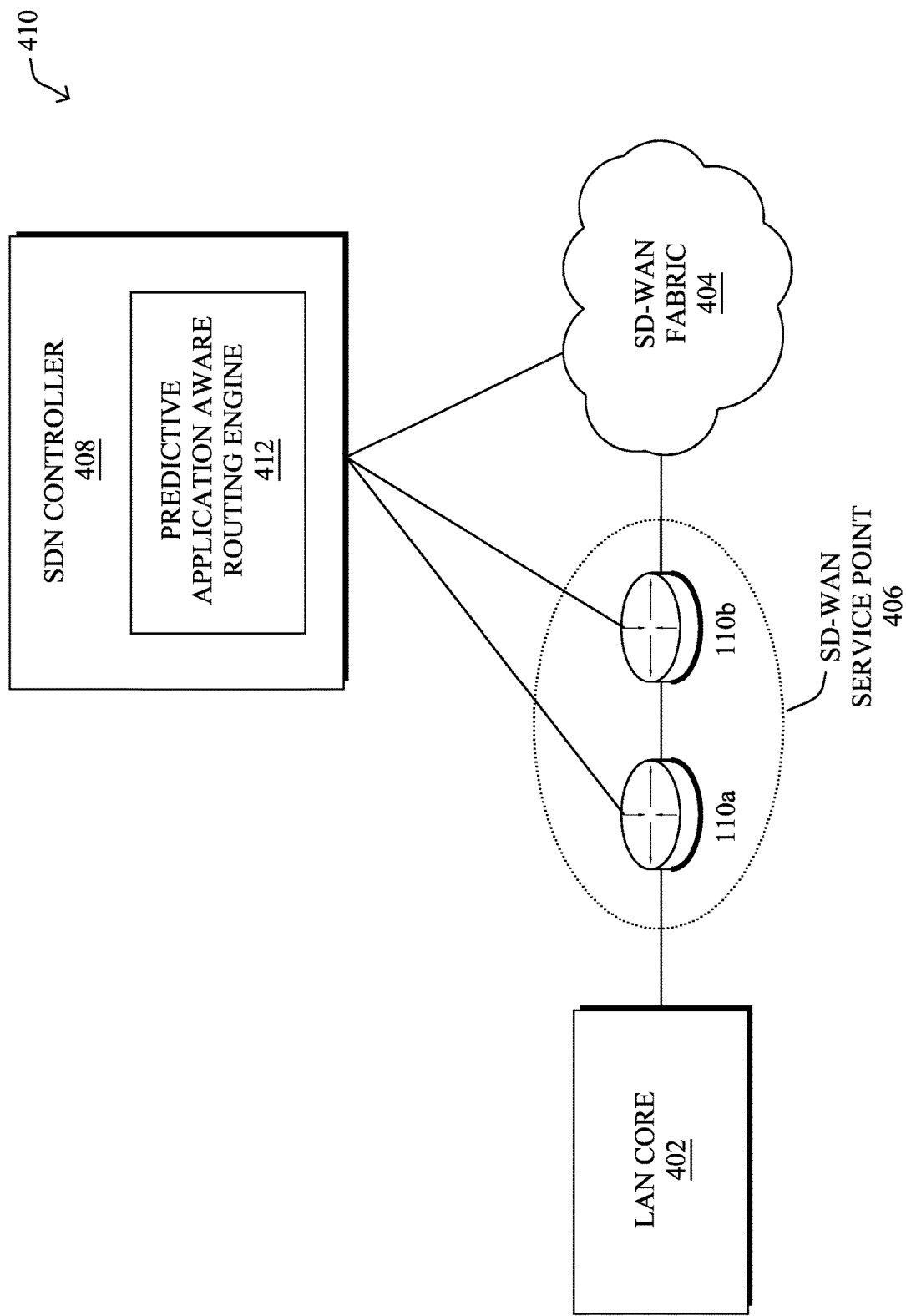

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As would be appreciated, modern SaaS applications are typically delivered globally via public cloud infrastructure using cloud native services. Even though public cloud providers may have a high number of points of presence (PoPs) and use those to deliver the application, globally. Still, testing has shown that user quality of experience (QoE) may vary greatly based on the location of the user. This is because all public cloud providers are delivering services which are region-based and applications are running in specific region(s) and location(s). Indeed, even though it might seem that an online application is global (e.g., because of its use of globally-available CloudFront POPs, etc.), in reality it might run in a single region/location and user experience might vary greatly based on the location.

To determine the QoE for a particular SaaS application, various approaches are possible such as:

Obtaining user feedback directly from the application

Applying traffic analytics, such as by analyzing Netflow records that include extra metrics like Application Response Time (ART)

Sending synthetic path probes to measure networking metrics to each SaaS application from each location. These probes are 'synthetic' in that they seek to mimic the actual characteristics of the traffic of the application under scrutiny.

The first approach above is rarely used today because of its complexity, but can still be used with the techniques herein. Note that relying on direct user feedback to drive routing decisions would also require supporting application programming interfaces (APIs) and the relevant network telemetry, in order to optimize the routing. The second and third approaches above are well-suited for use in Secure Access Service Edge (SASE)/SD-WAN implementations.

In various embodiments, predictive application aware routing engine 412 may make use of any or all of the above approaches. For instance, predictive application aware routing engine 412 may make use of an API for a particular online application, allowing it to obtain application experience/QoE metrics directly from the application. Such metrics may be combined with probing results and/or path telemetry. This is in sharp contrast to network-centric approaches that do not necessarily reflect the true user experience.

As noted above, predictive routing engines, such as predictive application aware routing engine 412, are able to provide better application experience for an online application by proactively forecasting events that degrade the user experience and proactively routing traffic of the application via a different path. More specifically, such an engine does so by leveraging machine learning to predict/forecast such events and switch the routes before the event occurs.

However, testing has revealed that path key performance indicator (KRI) metrics, such as loss, latency, jitter, throughput, or even the probability of an SLA violation (denoted "probSLAV" herein), often vary significantly over relatively short durations of time. This noisy data makes predicting when a given network path is likely to lead to unacceptable user experience in an application quite challenging and can lead to poor model performance by the predictive routing engine.

Predictive Network Routing with Dynamic Smoothing Envelope Creation for Noisy Network Timeseries The techniques herein provide for more effective forecasting/predicting of degraded user experience in a predictive routing system by applying smoothing envelopes to the noisy path KPI metric(s). Such an envelope denoises the timeseries and creates a cover for the timeseries so that poor-application experience periods are smoothed, aiding in effective forecasting by the system. In some aspects, the techniques herein also introduce ways to dynamically determine the 'best' duration for a smoothing window, such as by looking at early signs that allow the prediction engine to predict periods of degraded user experience. For example, an ideal smoothing window may allow the prediction engine to predict degradation events five minutes in advance, but not one hour beforehand. This has far-reaching consequences on the performance of the prediction engine since expecting it to make predictions too far in advance of early signs will lead to poor performance. In further aspects, the techniques herein allow for the continuous monitoring of such early signs for all paths and send messages to the training component as the data-pattern of the KPIs for the paths change. In addition, the techniques herein provide user interfaces for users such as network administrators, experts, and machine learning engineers to review the findings of the system and allow them to configure the predictive routing system, accordingly.

Illustratively, the techniques described herein may be performed by hardware, software, and/or firmware, such as in accordance with predictive routing process 248, which may include computer executable instructions executed by the processor 220 (or independent processor of interfaces 210) to perform functions relating to the techniques described herein.

Specifically, according to various embodiments, a device generates a plurality of smoothed timeseries by applying smoothing envelopes of different durations to a timeseries of a path metric for a path in a network that is used to convey traffic of an online application. The device uses the plurality of smoothed timeseries and the timeseries of the path metric to make predictions as to whether the path will provide an unacceptable user experience in the online application. The device selects a smoothing envelope of a particular duration, by comparing performance metrics for the predictions. The device uses a timeseries of the path metric smoothed using the smoothing envelope of the particular duration to make predictive routing decisions in the network for the traffic of the online application.

Figure 5:
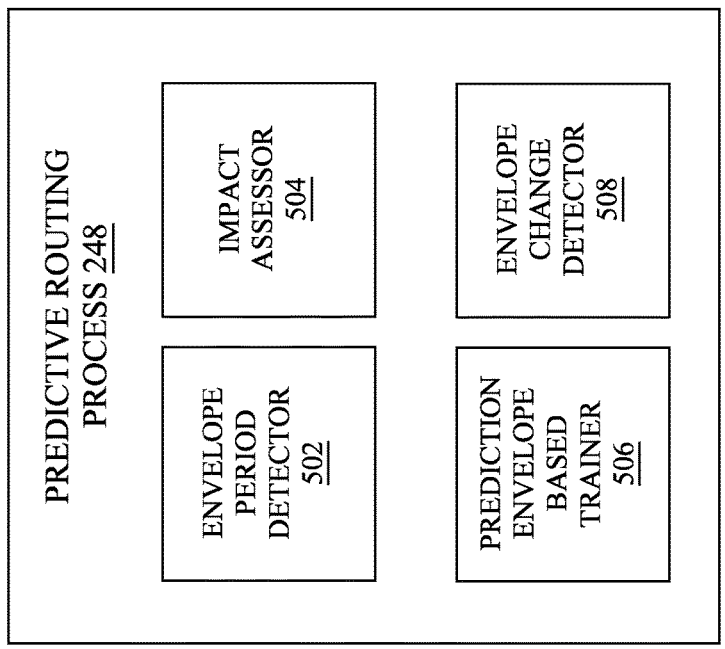
FIG. 5 illustrates an example architecture for predictive network routing with dynamic smoothing envelope creation for noisy network timeseries.

Operationally, FIG. 5 illustrates an example architecture 500 for predictive network routing with dynamic smoothing envelope creation for noisy network timeseries, according to various embodiments. At the core of architecture 500 is predictive routing process 248, which may be executed by a controller for a network or another device in communication therewith. For instance, predictive routing process 248 may be executed by a controller for a network (e.g., SDN controller 408 in FIGS. 4A-4B), a particular networking device in the network (e.g., a router, etc.), a client in a network, another device or service in communication therewith, or the like. In further embodiments, architecture 500 may be implemented as part of a SASE deployment.

As shown, architecture 500 may include any or all of the following components: an envelope period detector 502, an impact assessor 504, a prediction envelope based trainer 506, and/or an envelope change detector 508. As would be appreciated, the functionalities of these components may be combined or omitted, as desired. In addition, these components may be implemented on a singular device or in a distributed manner, in which case the combination of executing devices can be viewed as their own singular device for purposes of executing predictive routing process 248. Further, for simplicity, predictive routing process 248 may also include other components that are not shown, such as a predictive routing engine that is responsible for enacting predictive routing decisions in the network with respect to the traffic of a particular online application.

In general, and already discussed above, predictive routing process 248 may obtain telemetry data regarding the network and the online application of interest through various mechanisms. For instance, in an SD-WAN, the network telemetry may be measured using BFD probes that measure tunnel health (e.g., network KPI metrics such as loss, latency and jitter) and/or NetFlow records that indicate the type of application and the intensity of traffic flowing through multiple tunnels.

In various embodiments, envelope period detector 502 is responsible for detecting an envelope period/duration for a smoothing envelope to be applied to a path KPI timeseries. While smoothing can be used to reduce noise in a timeseries, a key challenge in the context of predictive routing is that the selected duration of the envelope can affect the performance of the prediction model that makes predictions on the smoothed timeseries. For instance, an envelope having a duration of one hour may provide better forecasting accuracy than that of a ten minute duration or vice-versa.

Figure 6:
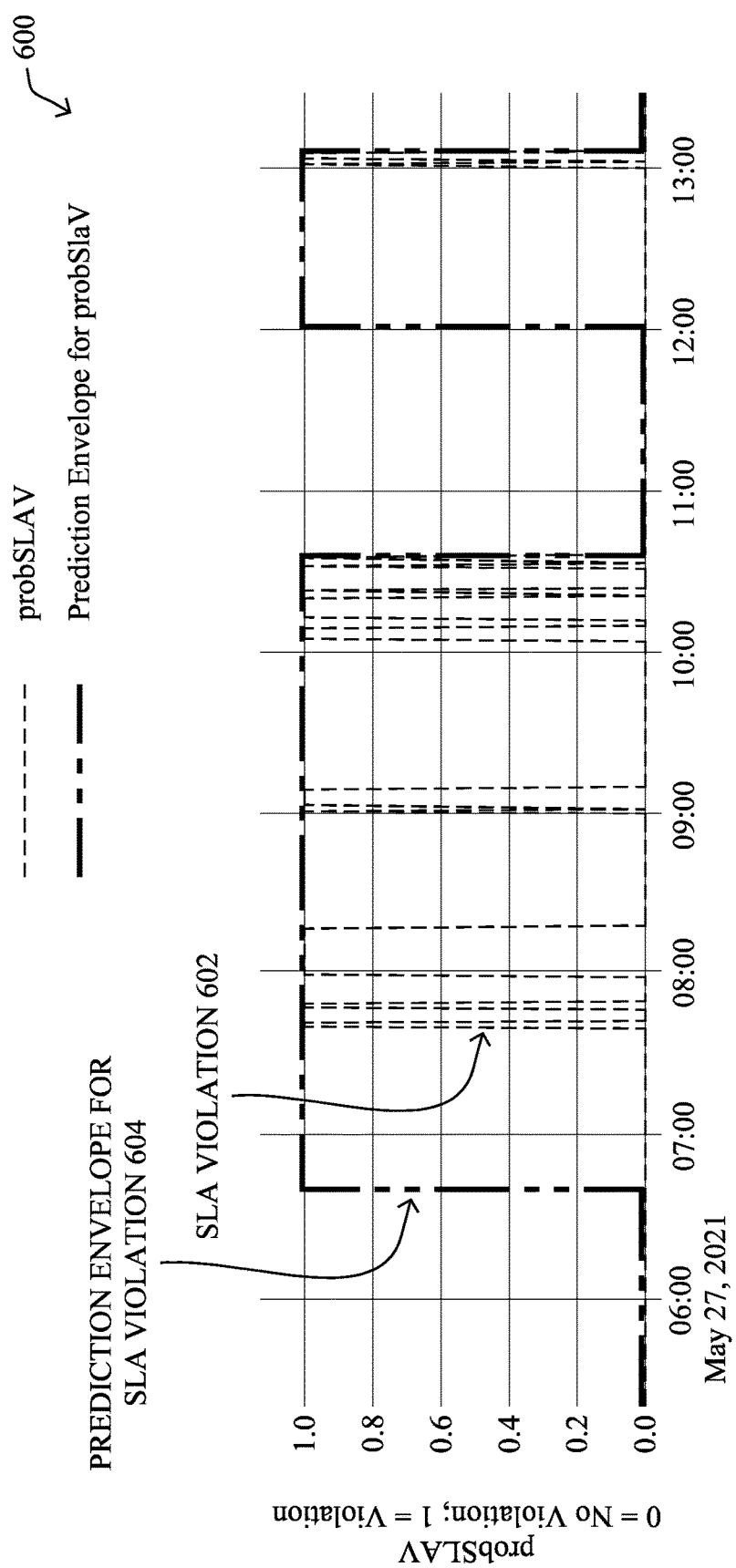
FIG. 6 illustrates an example plot showing a smoothing envelope for a path metric.

FIG. 6 illustrates an example plot 600 showing a smoothing envelope for a path metric, according to various embodiments. As shown, the probability of an SLA violation by a path ("probSLAV") is plotted over time, with a value of zero representing no SLA violation and a value of one representing an SLA violation. As can be seen, at approximately 7:45, probSLAV spikes to a value of one, indicating the occurrence of an SLA violation 602. From that point in time forward until a little after 10:30, probSLAV exhibits noisy behavior, spiking several times from no violation to an SLA violation.

In various embodiments, the techniques herein propose the use of a smoothing envelope that smooths the timeseries of the KPI metrics. For instance, a smoothing envelope 604 that can be used for proposes of making predictions for predictive routing is also shown in plot 600. Here, envelope 604 begins at some time before SLA violation 602, such as one hour in advance and maintains a constant probSLAV value of one throughout the time probSLAV is noisy. This means the prediction engine must predict SLA violation 602 one hour before it occurs and this buffer of one hour is given so that the forecaster can forecast it beforehand.

The main idea behind setting the envelope durations is that the prediction mechanism should have enough early signs to predict when the user experience will be unacceptable, without being selected in a manner that causes poor performance of the prediction model. For example, an envelope as in FIG. 6 rising one hour before the actual SLA violation may be desirable, but the loss, latency, and jitter along the path may also be very low and stable during that one hour time period. This means that the prediction engine cannot predict such a rising envelope one hour beforehand. However, there might be fluctuations in the jitter and loss (e.g., several seconds or minutes) before the SLA violation, thus providing a good signal to predict the violation. In such a case, it would be better to set the time period of the envelope to a few seconds or minutes, rather than one hour.

In other words, the optimal duration of the prediction window lead time for the smoothing envelope will depend on the desired forecast granularity. For instance, if the goal is to forecast the SLA violation during the next minute, the leading time of the order of few minutes would be sufficient. On the other hand, if it is desirable to predict the SLA violation during the next hour, a relatively longer window for the envelope, such as one hour, will be more appropriate.

In some embodiments, for each network path under consideration, envelope period detector 502 constructs a rolling maximum (denoted 'rolling-max') for different envelope time periods $\{d_1, d_2, \ldots, d_n\}$. Generally, a rolling-max takes the maximum value of the KPI in the next $d_i$ time periods. For instance, in the case of FIG. 6, the rolling-max taken for envelope 604 is time period $d_i$=1 hour. This rolling-max operation will result in the generation of a smoothed prediction envelope timeseries for a given KPI metric. In other embodiments, envelope period detector 502 may generate a smoothly rising envelope instead of sudden jumps while using rolling-max.

As would be appreciated, a forecasting/prediction engine can be trained on such smoothed timeseries generated by envelope period detector 502, and the performance metrics for the resulting predictions measures. Typically, these performance metrics may take the form of precision and/or recall metrics, although other metrics may be used or derived therefrom. For instance, the prediction engine used for predictive routing may take the form of a linear regression mode with features such as the value at previous timestep, previous seasonality time period, etc. Or, it may even take the form of a more complex Long Short-Term Memory (LSTM) network with multi-variate timeseries feature input such as by taking as input the loss, latency, jitter, and probSLAV timeseries. Regardless of the specific form of machine learning model selected, the prediction model may be run for each envelope time period $d_i$, and the best period $d_i$ may be selected by envelope period detector 502 as the envelope duration time period for a given path. In turn, envelope period detector 502 may then store the information <pathId, KPI, application, $d_i$> for reference.

In another embodiment, envelope period detector 502 may perform statistical analysis to examine at which time periods initial early-signs of unacceptable user experience occur. For example, envelope period detector 502 may use time-lagged cross correlation (TLCC) to measure correlation between the probSLAV and associated features such as loss, latency, jitter, etc.

Figure 7B:
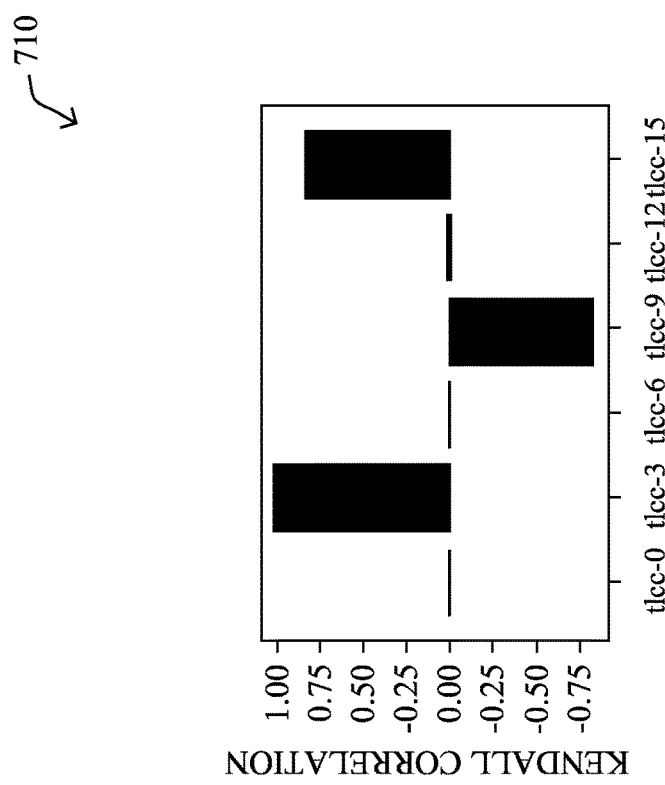
FIGS. 7A-7B illustrate example plots demonstrating time-lagged cross correlation.
Figure 7A:
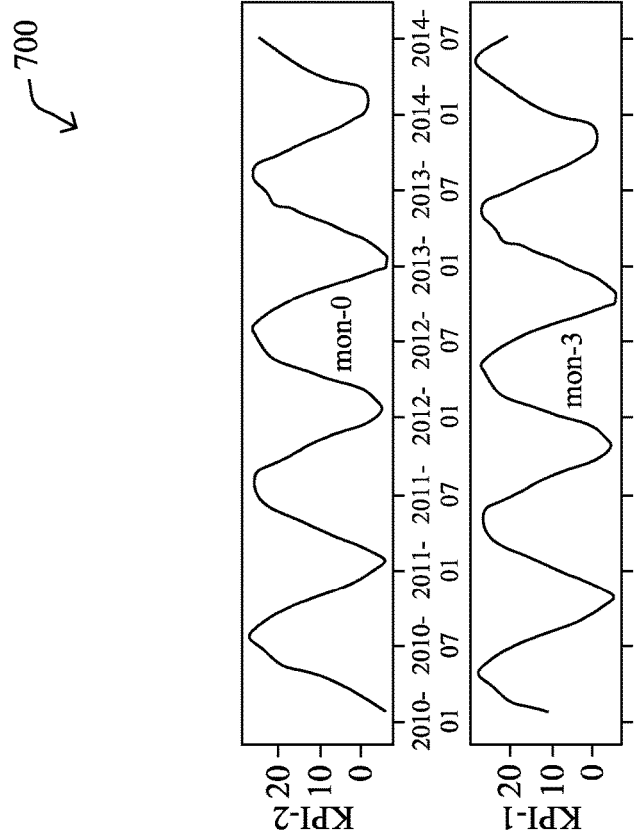

In TLCC, the correlation is computed between two timeseries by taking a correlation between one timeseries and lagged value of another timeseries. For instance, FIG. 7A illustrates an example plot of two different KPI timeseries: KPI-1 which is purposely lagged by a certain amount from that of another timeseries, KPI-2.

In turn, the $k^{th}$ lagged value of the first timeseries may be computed by shifting the timeseries by k units before. Any correlation metric, such as Pearson's or Kendall's correlation coefficient, can be computed between one timeseries and the k-lagged second timeseries. For instance, FIG. 7B shows a plot 710 of the Kendall's correlation coefficient for the two timeseries from FIG. 7A. As can be seen, when the first timeseries is lagged by 3, 9 and 15 units, it has a very high correlation with the second timeseries. Such analysis can be performed by envelope period detector 502 between say, probSLAV and jitter (or any other KPI metrics), to find out how many time units before (i.e., lags before) there is a correlated signal for jitter before a predicted SLA violation.

In yet other embodiments, envelope period detector 502 may employ a more complex statistical analysis about points where the user experience is unacceptable (e.g., when the probSLAV is one), to check whether there is any distribution difference in other KPI metrics, such as jitter. For example, such degradation points can be marked, and the distribution of the $95^{th}$ percentile of jitter values at $d_i$ time period before the degradation point can be compared with times where the user experience is not degraded. In turn, envelope period detector 502 may select the maximum period $d_i$ with significant difference in distribution as the envelope time period for that path.

In other instances, envelope period detector 502 may provide information regarding the computed envelope time periods/durations for different applications and prediction performance metrics for review by an expert user (e.g., a network administrator, machine learning engineer, etc.). For example, envelope period detector 502 may show the distribution of optimal $d_i$ and performance metrics for multiple applications. In turn, the user may be able to select any anomalous paths or applications, and see whether the duration in use is justified. The user may also enable/disable prediction window computations on some paths, as they see fit.

Figures 8A, 8B:
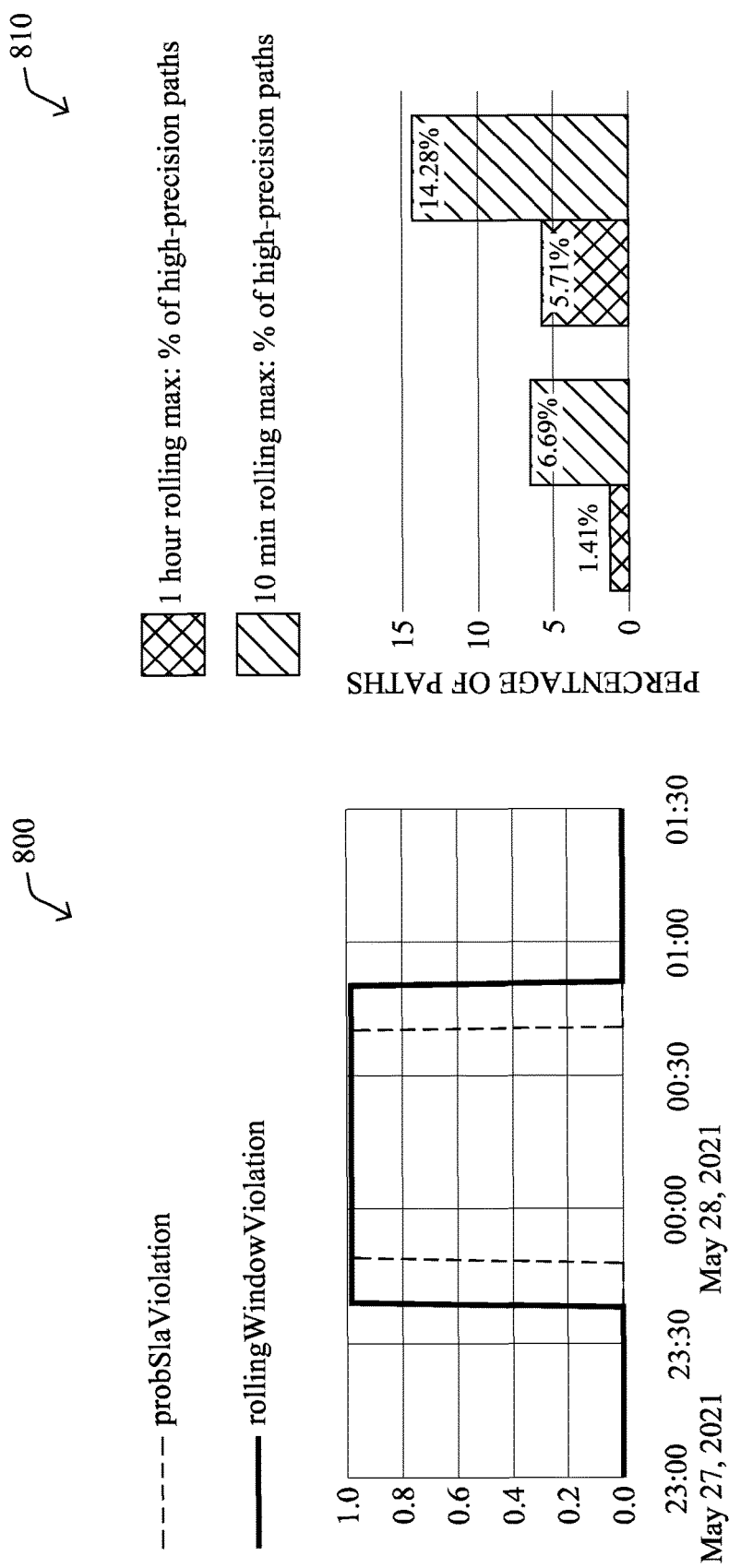
FIGS. 8A-8B illustrate example plots comparing the results of using envelopes of different durations.

FIGS. 8A-8B illustrate example plots comparing the results of using envelopes of different durations, according to various embodiments. In addition, plots 800, 810 may also be presented via a user interface for review by a user by envelope period detector 502. As shown in plot 800 in FIG. 8A, an envelope with a duration corresponding a rolling-max of ten minutes my be shown to the user for review, along with the original KPI timeseries.

FIG. 8B illustrates an example plot 810 comparing two different envelope durations, with one having a rolling-max of one hour and the other having a rolling-max of ten minutes. As shown, envelope period detector 502 may also present for display data indicative of the performance of the prediction model when different envelope durations are used to smooth the KPI timeseries. Here, two envelopes are compared: one having a rolling-max of one hour and another having a rolling-max of ten minutes for different sets of connections to the online application. As can be seen, the percentage of paths for which the prediction model exhibited high precision (e.g., greater than 90% with a recall greater than 20%) can be boosted by 2-6 times by selecting the proper smoothing envelope. Note also that the percentage of high-precision paths is one of the effective performance metrics to measure how well the prediction engine is in predicting poor application experience before it occurs. Of course, other performance metrics could also be used, as desired.

Referring again to FIG. 5, impact assessor 504 may be in charge of evaluating the impact that the selected duration for the envelope window has on the traffic. As explained earlier, the rolling-max has a direct influence on forecasting accuracy, a shorter window leading to higher forecasting accuracy. A common constraint in predictive routing system is that the predictions are typically performed in the cloud. This means that the raw telemetry must first be retrieved by the cloud, which adds to the overall processing time in making the predictions. For some devices equipped with more processing power, the inference of the predictive model can take place at the edge of the network, allowing for a much shorter rolling-max window.

Moreover, some mechanisms have been proposed in the past allowing for a fast processing of telemetry from device carrying traffic of high priority. The aim of impact assessor 504 is then to compute the Minimum Processing Time (MPT) for each path, taking into account the constraints to send the telemetry data to the prediction engine, along with other attributes such as the type of application, volume, etc., for the traffic.

In some embodiments, impact assessor 504 may allow an expert user, such as a network administrator, to select the optimum rolling-max for each path (of interest), knowing the type and volume of traffic along with the MPT. If the rolling-max value cannot meet the required forecasting needs (e.g., a rolling-max of 10 minutes would provide the best accuracy for a critical path, but the processing time of telemetry is too high), this allows the network administrator to trigger some configuration changes in the network.

Prediction envelope based trainer 506 may be responsible for creating prediction envelopes as determined by envelope period detector 502 for all paths and online applications of interest, in various embodiments. To do so, prediction envelope based trainer 506 may obtain the KPI metric for a given application A and path P, and respective envelope time period $d_i$ (e.g., from a datalake to which envelope period detector 502 stores its results). In turn, prediction envelope based trainer 506 may compute another metric, say, by computing the prediction envelope with given period.

Prediction envelope based trainer 506 may then use the prediction envelope to predict rather than the original probSLAV. Note that the input features can still include multiple other KPI metrics, including the raw probSLAV. However, the output predicted is the prediction envelope.

Another point to note is that the creation of an envelope in this manner does not create any data leak since: a.) the envelope is just the output on which the model is trained and is not used as an input feature, b.) it is only used in the training, and not in the inference, c.) the envelope is not used in the evaluation metrics. Other than this, the model training and inference can use standard procedure to train the forecaster.

According to various embodiments, envelope change detector 508 may be responsible for continuously tracking whether the selected envelope duration/time period is necessary for boosting the forecasting accuracy. In one embodiment, this can be done by continually running envelope period detector 502 before every training and successive model evaluation. However, this is likely to be computationally inefficient since envelope period detector 502 will evaluate for multiple windows, etc.

In other embodiments, envelope change detector 508 may evaluate for every time period of a set length (e.g., every day), the distribution of events exhibiting unacceptable user experience and the distribution of KPI metrics before such events (e.g., the 95th percentile of jitter $d_i$ units before experience degradation events).

For example, assume that envelope change detector 508 measures the $95^{th}$ percentile of jitter 1-hour before degraded user experience, every day. Let D(J0.95, 1) be the distribution of the $95^{th}$ percentile of jitter for day-1. Let D(J0.95, 2) be the same distribution on day-2. Envelope change detector 508 can compute a distribution difference using algorithms such as based on the Kolmogorov-Smirnov (KS) statistic. In this example, the distribution difference of $95^{th}$ percentile of jitter between day-2 and day-1 is the KS-Statistic between D(J0.95, 2) and D(J0.95, 1). If this difference is greater than a certain threshold (e.g., 0.2), it means that the distribution has changed, significantly. If the distribution has changed significantly, envelope change detector 508 can then trigger envelope period detector 502 to recompute the best envelope time period, accordingly.

Figure 9:
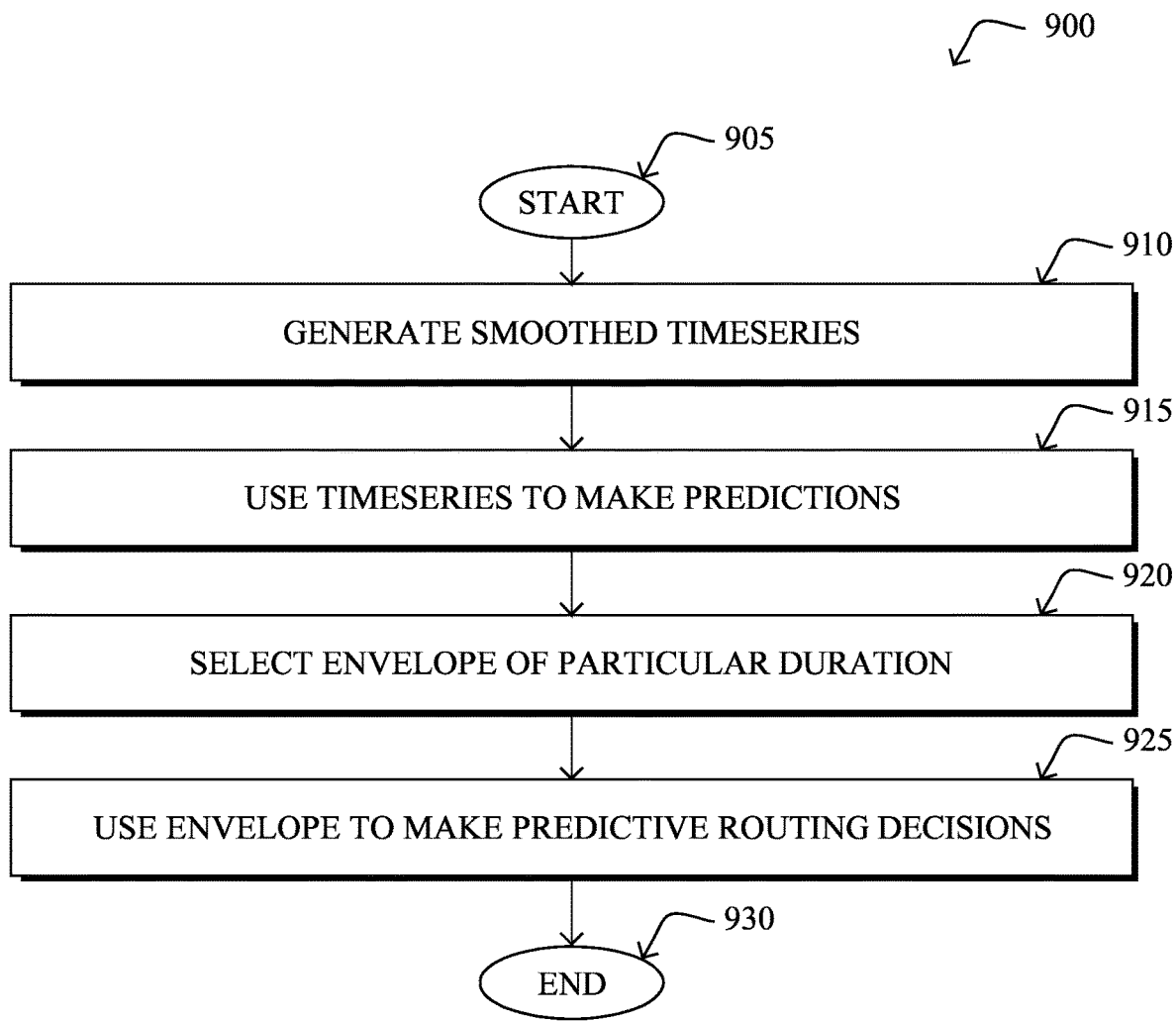
FIG. 9 illustrates an example simplified procedure for performing predictive network routing with dynamic smoothing envelope creation for noisy network timeseries.

FIG. 9 illustrates an example simplified procedure 900 (i.e., a method) for performing predictive network routing with dynamic smoothing envelope creation for noisy network timeseries, in accordance with one or more embodiments described herein. For example, a non-generic, specifically configured device (e.g., device 200), such as controller for a network (e.g., an SDN controller or other device in communication therewith, a routing engine, etc.), a networking device, etc., may perform procedure 900 by executing stored instructions (e.g., predictive routing process 248). The procedure 900 may start at step 905, and continues to step 910, where, as described in greater detail above, the device may generate a plurality of smoothed timeseries by applying smoothing envelopes of different durations to a timeseries of a path metric for a path in a network that is used to convey traffic of an online application. In one embodiment, the path metric indicates a probability of the path violating a service level agreement associated with the online application. In further embodiments, the path metrics may indicate loss, latency, jitter, or throughput of the path. In some embodiments, the different durations are selected based in part on a processing time associated with making the predictions. In various embodiments, the device may generate the plurality of smoothed timeseries by identifying the particular duration by performing timelagged cross correlation between the timeseries of the path metric and a timeseries of a second path metric. In other embodiments, the device may do so by determining a distribution difference between the path metric and a second path metric.

At step 915, as detailed above, the device may use the plurality of smoothed timeseries and the timeseries of the path metric to make predictions as to whether the path will provide an unacceptable user experience in the online application. For instance, the device may use those timeseries with a forecasting/prediction model, to predict whether the path will provide degraded user experience during a future time period.

At step 920, the device may select a smoothing envelope of a particular duration, by comparing performance metrics for the predictions, as described in greater detail above. In some embodiments, the performance metrics for the predictions comprise precision metrics or recall metrics for the predictions. In some embodiments, the device may also provide an indication of the smoothing envelope of the particular duration to a user interface and receive, from the user interface, an instruction to make the predictive routing decisions using the timeseries of the path metric smoothed using the smoothing envelope of the particular duration instead of the timeseries of the path metric. In one embodiment, the device may use a prediction model to output the smoothing envelope of the particular duration.

At step 925, as detailed above, the device may use a timeseries of the path metric smoothed using the smoothing envelope of the particular duration to make predictive routing decisions in the network for the traffic of the online application. In one embodiment, the predictive routing decisions comprise a decision to reroute the traffic of the online application in the network, in advance of a prediction that the path will provide unacceptable user experience in the online application. In some embodiments, the device may also repeatedly evaluate whether a smoothing envelope having a different duration than that of the particular duration should be used to make the predictive routing decisions. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for predictive network routing with dynamic smoothing envelope creation for noisy network timeseries, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
generating, by a device, a plurality of smoothed timeseries by applying smoothing envelopes of different durations to a timeseries of a path metric for a path in a network that is used to convey traffic of an online application;
using, by the device, the plurality of smoothed timeseries and the timeseries of the path metric to make predictions as to whether the path will provide an unacceptable user experience in the online application;
selecting, by the device, a smoothing envelope of a particular duration, by comparing performance metrics for the predictions; and
using, by the device, a timeseries of the path metric smoothed using the smoothing envelope of the particular duration to make predictive routing decisions in the network for the traffic of the online application.

2. The method as in claim 1, wherein the performance metrics for the predictions comprise precision metrics or recall metrics for the predictions.

3. The method as in claim 1, wherein the path metric indicates a probability of the path violating a service level agreement associated with the online application.

4. The method as in claim 1, wherein the different durations are selected based in part on a processing time associated with making the predictions.

5. The method as in claim 1, further comprising:
providing, by the device, an indication of the smoothing envelope of the particular duration to a user interface; and
receiving, at the device and from the user interface, an instruction to make the predictive routing decisions using the timeseries of the path metric smoothed using the smoothing envelope of the particular duration instead of the timeseries of the path metric.

6. The method as in claim 1, wherein generating the plurality of smoothed timeseries comprises:
identifying the particular duration by performing timelagged cross correlation between the timeseries of the path metric and a timeseries of a second path metric.

7. The method as in claim 1, wherein generating the plurality of smoothed timeseries comprises:
determining a distribution difference between the path metric and a second path metric.

8. The method as in claim 1, further comprising:
repeatedly evaluating whether a smoothing envelope having a different duration than that of the particular duration should be used to make the predictive routing decisions.

9. The method as in claim 1, further comprising:
using a prediction model to output the smoothing envelope of the particular duration.

10. The method as in claim 1, wherein the predictive routing decisions comprise a decision to reroute the traffic of the online application in the network, in advance of a prediction that the path will provide unacceptable user experience in the online application.

11. An apparatus, comprising:
one or more network interfaces;
a processor coupled to the one or more network interfaces and configured to execute one or more processes; and
a memory configured to store a process that is executable by the processor, the process when executed configured to:
generate a plurality of smoothed timeseries by applying smoothing envelopes of different durations to a timeseries of a path metric for a path in a network that is used to convey traffic of an online application;
use the plurality of smoothed timeseries and the timeseries of the path metric to make predictions as to whether the path will provide an unacceptable user experience in the online application;
select a smoothing envelope of a particular duration, by comparing performance metrics for the predictions; and
use a timeseries of the path metric smoothed using the smoothing envelope of the particular duration to make predictive routing decisions in the network for the traffic of the online application.

12. The apparatus as in claim 11, wherein the performance metrics for the predictions comprise precision metrics or recall metrics for the predictions.

13. The apparatus as in claim 11, wherein the path metric indicates a probability of the path violating a service level agreement associated with the online application.

14. The apparatus as in claim 11, wherein the different durations are selected based in part on a processing time associated with making the predictions.

15. The apparatus as in claim 11, wherein the process when executed is further configured to:
provide an indication of the smoothing envelope of the particular duration to a user interface; and
receive, from the user interface, an instruction to make the predictive routing decisions using the timeseries of the path metric smoothed using the smoothing envelope of the particular duration instead of the timeseries of the path metric.

16. The apparatus as in claim 11, wherein the apparatus generates the plurality of smoothed timeseries by:
identifying the particular duration by performing timelagged cross correlation between the timeseries of the path metric and a timeseries of a second path metric.

17. The apparatus as in claim 11, wherein the apparatus generates the plurality of smoothed timeseries by:
determining a distribution difference between the path metric and a second path metric.

18. The apparatus as in claim 11, wherein the process when executed is further configured to:
repeatedly evaluate whether a smoothing envelope having a different duration than that of the particular duration should be used to make the predictive routing decisions.

19. The apparatus as in claim 11, wherein the predictive routing decisions comprise a decision to reroute the traffic of the online application in the network, in advance of a prediction that the path will provide unacceptable user experience in the online application.

20. A tangible, non-transitory, computer-readable medium storing program instructions that cause a device to execute a process comprising:
generating, by the device, a plurality of smoothed timeseries by applying smoothing envelopes of different durations to a timeseries of a path metric for a path in a network that is used to convey traffic of an online application;
using, by the device, the plurality of smoothed timeseries and the timeseries of the path metric to make predictions as to whether the path will provide an unacceptable user experience in the online application;
selecting, by the device, a smoothing envelope of a particular duration, by comparing performance metrics for the predictions; and
using, by the device, a timeseries of the path metric smoothed using the smoothing envelope of the particular duration to make predictive routing decisions in the network for the traffic of the online application.

* * * * *

UNITED STATES PATENT AND TRADEMARK OFFICE
CERTIFICATE OF CORRECTION

| | | |
|---|---|---|
| PATENT NO. | : 11,895,008 B1 | |
| APPLICATION NO. | : 17/871123 | |
| DATED | : February 6, 2024 | |
| INVENTOR(S) | : Sambarta Dasgupta et al. | |

It is certified that error appears in the above-identified patent and that said Letters Patent is hereby corrected as shown below:

In the Specification

Column 9, Line 34 please amend as shown:
QoE from the standpoint of the users of the application Column 11, Line 8 please amend as shown:
indicator (KPI) metrics, such as loss, latency, jitter, through- Signed and Sealed this
Thirtieth Day of April, 2024

Katherine Kelly Vidal
*Director of the United States Patent and Trademark Office*